June 6, 1944.  J. B. PARSONS  2,350,634
VEHICLE TOP OPERATING MECHANISM
Filed July 30, 1942  2 Sheets-Sheet 1

John B. Parsons
INVENTOR

BY Malcolm W. Fraser
ATTORNEY

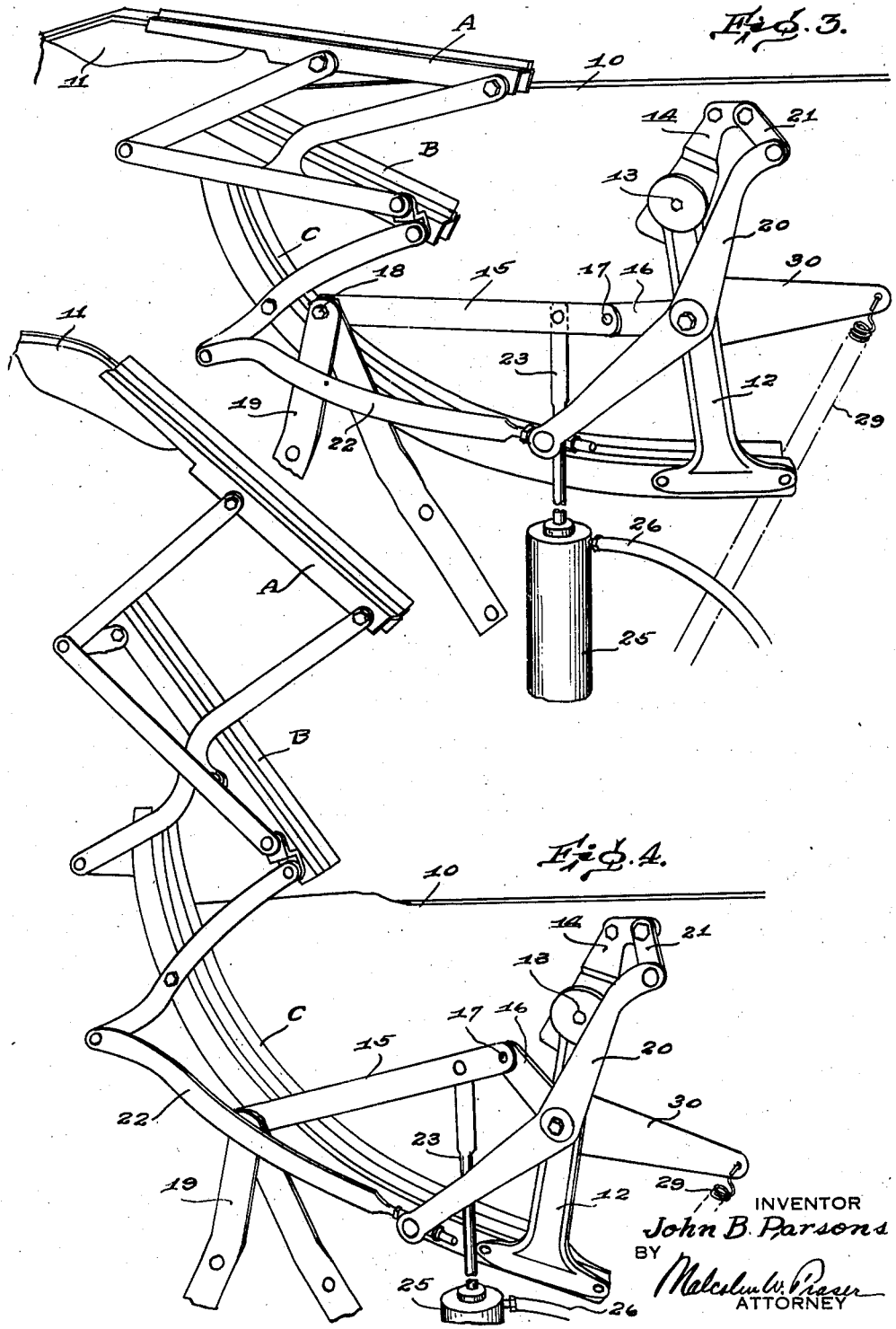

Patented June 6, 1944

2,350,634

UNITED STATES PATENT OFFICE 2,350,634

VEHICLE TOP OPERATING MECHANISM

John B. Parsons, Toledo, Ohio

Application July 30, 1942, Serial No. 452,866

3 Claims. (Cl. 296—117)

This invention relates to vehicles, such as automobiles, of the so-called convertible type in which the automobile top can be lowered or folded back, but more particularly to mechanism for raising and lowering such foldable tops.

An object is to produce an automatic or power controlled top operating mechanism for a so-called convertible vehicle so constructed and arranged that greater power is applied when greater effort is required for effecting a smoother top movement free from intermittent pauses ordinarily experienced in power operated tops of this character.

Another object is to produce a power operated mechanism for convertible tops of the above character which is so constructed and arranged positively to hold or lock the top in its folded or lowered position, thereby to reduce vibrations or jarring movements usually experienced in these tops when in lowered position.

A still further object is to produce a power operated hydraulic mechanism for actuating a top of convertible vehicles, such as automobiles, having the new and improved features of construction, arrangement and operation hereinafter more fully described.

For purposes of illustration but not of limitation, an embodiment of the invention is shown on the accompanying drawings in which Figure 1 is a fragmentary side elevation viewed from the inside of an automobile body equipped with a hydraulically operated actuating mechanism for the folding top, the top being shown in its raised or unfolded position;

Figure 3 is an enlarged fragmentary view showing the top operating mechanism in folded or lowered position; and Figure 4 is a view similar to Figure 3 but showing the top in partly raised position.

Figures 1, 2:
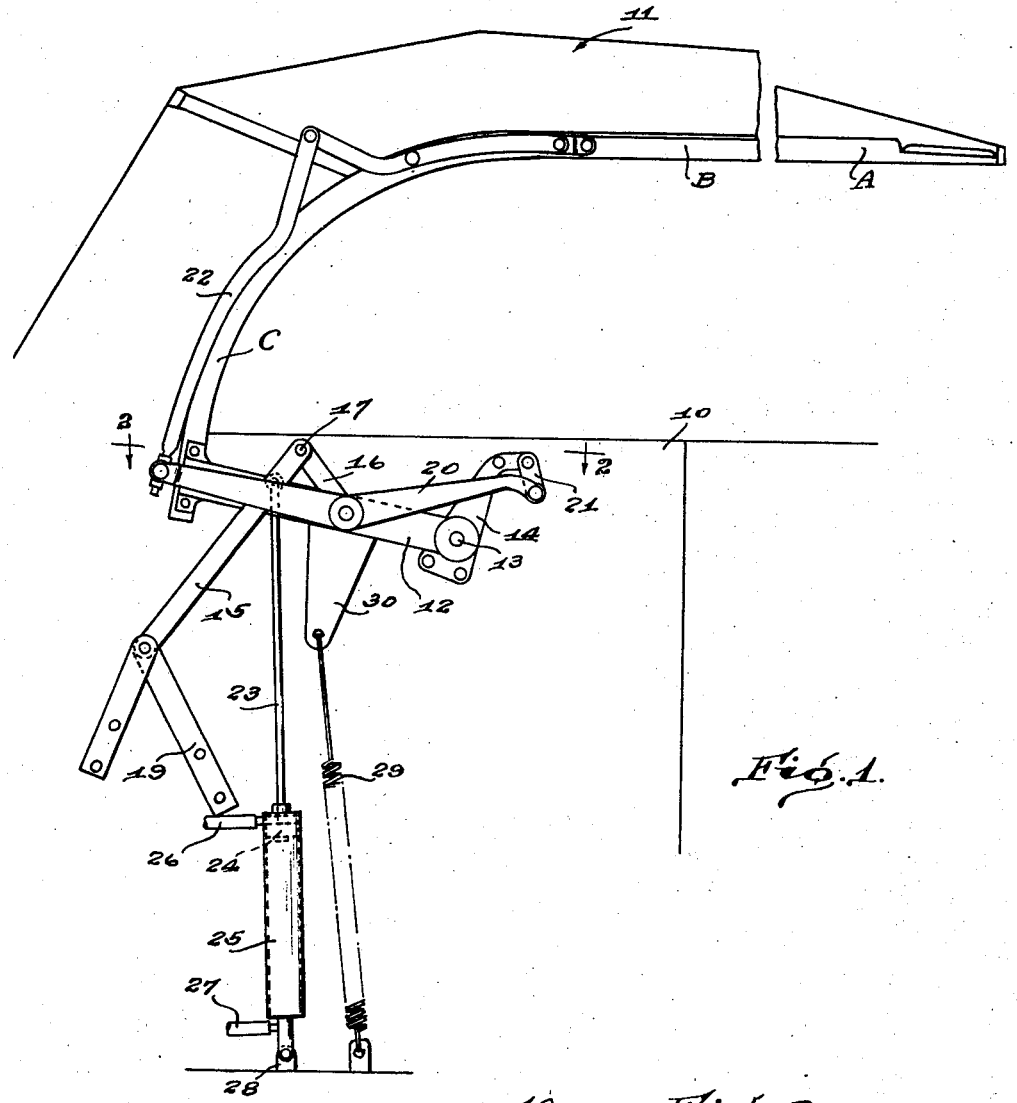
Figure 2 is a transverse sectional view substantially on the line 2—2 of Figure 1.

The illustrated embodiment of the invention comprises an automobile body 10 of the so-called convertible type having the usual foldable or fabric top 11 which can be either raised to useful position or folded back, usually into a well or receptacle in the rear end portion of the vehicle body. Complete details regarding the top supporting mechanism are not given because such details do not form any part of the present invention. Only so much of this mechanism is shown as to enable a full and complete understanding of the invention. Suffice it to say that the top supports include sections A, B and a bottom or rear elongate curved section C. The section C has fixed to it what may be termed a main operating lever 12, one end of which is fixed to the inner end of the curved section C, the opposite end being pivoted at 13 to a bracket 14 fixed to the inside of the vehicle body 10. From an inspection of Figures 3 and 4, it will be apparent that when the arm 12 swings in a clockwise direction, the supporting segments A, B and C are swung upwardly and forwardly and due to the link and leverage connections between these sections, they are gradually brought into alignment with each other until they assume the position indicated in Figure 1. Thereupon the front end of the top is secured to the windshield frame by suitable clamping device (not shown).

As above mentioned, this mechanism for supporting the top 11 and for causing the supporting segments to move into and out of alignment forms no part of the invention and is recognized as being old and well-known in the art. In accordance with this invention, a pair of toggle links 15 and 16 are pivoted together at 17. The outer end of the link 15 which is of much greater length than the link 16, is pivotally mounted at 18 to a bracket 19 which is fixed to the vehicle body. The opposite end of the shorter link 16 is pivoted to the main operating arm 12 intermediate the ends thereof. On the same pivot which receives the outer end of the link 16, is also mounted an arm 20, one end of which is connected by a link 21 to the bracket 14 and the opposite end of which is connected to link 22 which forms a part of the link and lever system above mentioned. As is best shown in Figure 3, the fixed pivots 13 and 18 are spaced from each other a distance which exceeds the length of either of the toggle links 15 and 16.

When the toggle links 15 and 16 are substantially in alignment, or with the pivot 17 a little below aligned position as indicated in Figure 3, the top 11 and associated supporting structure is in its completely folded or lowered position, the main operating arm 12 being moved sufficiently for this purpose. In such position, the toggle links obviously hold the top and associated supporting links and levers positively in folded position with sufficient rigidity to obviate almost entirely the jars and vibrations and the noise incident thereto. This positive locking of the top in its folded position is an important characteristic of the invention and has been found to eliminate many objections heretofore inherent in tops of this character. Heretofore in its lowered or folded position, a convertible top was the cause of much objectionable noise and rattles because of the difficulty in holding the parts in a rigid manner.

For actuating the top to and from position of use, a piston rod 23 is pivoted at one end to the link 15 adjacent the pivotal connection 17. The piston rod 23 is vertically disposed and at its lower end is a piston 24 which reciprocates within a vertically disposed cylinder 25. At the upper and lower ends of the cylinder 25 connect tubes 26 and 27 respectively for admitting liquid under pressure above or below the piston 24 according to the direction of movement desired for the piston rod 23.

It will be manifest that upon introducing liquid under pressure to the under side of the piston 24, the piston rod 23 is moved upwardly. In the first instance, the toggle formed by the links 15 and 16 is broken and as the piston rod 23 continues its movement upwardly the main operating arm 12 is caused to move to the left (Figure 4). This movement, as above indicated, causes the arcuate support C and the segments A and B to move upwardly and gradually straighten out to the position indicated in Figure 1. Some slight rocking motion with respect to the cylinder 25 is desired to compensate for the swinging movement of the link 15 and for this purpose, the lower end of the cylinder 25 is pivotally mounted as indicated at 28.

The action of the piston rod 23 is assisted by a coil spring 29 which is attached at one end to an outwardly projecting arm 30 fixed to the main operating arm 12. The spring 29 is under its greatest tension when the top is in its lowered or folded position thereby assisting in breaking the toggle when the piston rod 23 commences its upward movement. It will be manifest that the force of the spring is gradually expended as the main operating arm 12 continues its rocking movement in a clockwise direction with the top approaching its raised position when the spring is again under tension. Upon folding of the top or moving it from its raised to its lowered position, the above operation is reversed and the parts move rearwardly and downwardly until the toggle links are straightened out as shown on Figure 3.

It will be understood that similar mechanism is provided on the opposite side of the vehicle but description and illustration of one side is considered sufficient.

One important feature of the invention resides in the arrangement of the toggle links 15 and 16 which apply greater operating power when greater effort is required. For example, when the top is in its lowered or folded position, greater effort is necessary to start the top upwardly to its raised position. Such increased power is provided because in the first instance the slight movement of the pivot rod 23 upwardly imparts through the toggle arrangement, greater power for moving the main operating arm 12 and associated links and levers. Then, as the top is raised or unfolded and the link 15 swings upwardly, the lifting power gradually decreases. Attention is also directed to the fact that when the links 15 and 16 are in the position shown in Figure 3, with the top in its lowered or folded position, the toggle links are not exactly in alignment but on the contrary the pivot 17 slightly passes below center thereby insuring that the top will remain in its folded position.

It is to be understood that numerous changes in details of construction, arrangement and operation may be effected without departing from the spirit of the invention especially as defined in the appended claims.

What I claim is:

1. Operating means for a folding vehicle top comprising controlling links and levers therefor including a main operating lever pivotally connected at one end to the vehicle body, said main operating lever being adapted to swing about its pivoted connection to the body during raising of the top, a first toggle link pivotally connected to said main operating lever intermediate the ends of the latter, a second toggle link pivoted on the vehicle body at a point spaced from the pivotal connection between main operating lever and the vehicle body a distance which exceeds the length of either of said toggle links, said first and second toggle links being pivoted together and lying in substantial alignment when the top is in lowered position, and power means for forcing said toggle links out of alignment to thereby swing said main operating lever in a direction to effect raising of the top.

2. Operating means for a folding vehicle top comprising controlling links and levers therefor including a main operating lever pivotally connected at one end on the vehicle body and extending downwardly from its pivoted connection when the top is in lowered position, said main operating lever being adapted to swing rearwardly about its pivoted connection to the body during raising of the top, a first toggle link pivotally connected to said main operating lever intermediate the ends of the latter, a second toggle link pivoted on the vehicle body at a point substantially to the rear of the pivotal connection of said main operating lever to said body, said first and second toggle links being pivoted together and lying in substantial alignment when the top is in lowered position, and power means for forcing the inner ends of said toggle links upwardly, thereby providing a large component of force acting to swing said main operating lever rearwardly during the initial stage of raising said top.

3. Operating means for a folding vehicle top comprising controlling links and levers therefor, including a main operating lever pivotally connected at one end to the vehicle body, said main operating lever in the lowered or folded position of the top extending downwardly in a vertically disposed position and being adapted to swing about its pivotal connection to the body during raising of the top and to lie in a horizontally disposed position when the top is fully raised, a first toggle link pivotally connected to said main operating lever intermediate the ends of the latter and being adapted to swing from a substantially horizontal position when the main operating lever is in its said vertically disposed position to an upwardly inclined position when the top is fully raised, a second toggle link pivoted at one end to the free end of said first toggle link and pivoted at its opposite end on the vehicle body at a point spaced from the pivotal connection between said main operating lever and the vehicle body a distance which exceeds the length of either of said toggle links, said second toggle link lying in substantial alignment with said first toggle link when the main operating lever is in said vertically disposed position and being adapted to swing upwardly during the raising of the top, and power means for forcing said toggle links out of alignment thereby to swing said main operating lever from its said vertically disposed position to its said horizontally disposed position to effect raising of the top.

JOHN B. PARSONS.